United States Patent [19]

Black

[11] Patent Number: 4,685,103

[45] Date of Patent: Aug. 4, 1987

[54] CONTROL CIRCUIT FOR A CENTREX ATTENDANT CONSOLE INTERFACE

[75] Inventor: James B. Black, Phoenix, Ariz.

[73] Assignee: GTE Communication Systems Corporation, Phoenix, Ariz.

[21] Appl. No.: 813,321

[22] Filed: Dec. 24, 1985

[51] Int. Cl.$^4$ ............................................. H04Q 11/04
[52] U.S. Cl. ........................................ 370/58; 307/273
[58] Field of Search .............. 307/247 R, 273; 370/58

[56] References Cited

U.S. PATENT DOCUMENTS 3,613,017 10/1971 Howells .......................... 307/273 X
4,516,237 5/1985 Perry et al. ............................ 370/58
4,575,839 3/1986 Ogata et al. ....................... 370/58 X Primary Examiner—Douglas W. Olms
Assistant Examiner—Melvin Marcelo
Attorney, Agent, or Firm—Anthony Miologos; Peter Xiarhos

[57] ABSTRACT

A control circuit for effecting the transfer of data messages between an interface circuit and a CENTREX equipped central office exchange. The central office exchange includes a peripheral processor and the interface circuit includes an input and an output sequential memory for receiving and sending respectively, data messages to the peripheral processor. An input control circuit includes a first gating means having inputs connected to the peripheral processor and which produces an output signal responsive to the simultaneous application of a first and a second control signal. First bistable memory means receives the gating means output signal and further includes a clock input connected to a write select signal from the peripheral processor. Responsive to the write select signal, the gating means output signal is stored in the first bistable memory means. Second bistable memory means connected to the first bistable memory means output includes a clock input connected to a source of clocking signals. During the rising edge of the clocking signal the second bistable memory means outputs a signal which is combined with an input enabling signal from the peripheral processor by a second gating means to produce a shift-in signal for the input sequential memory. An output control circuit is substantially similar to the first control circuit with the exception of the use of a read select signal instead of a write select signal by the first bistable memory means. An output enable signal is used with the second bistable memory means output to produce a shift-out signal for the output sequential memory.

11 Claims, 7 Drawing Figures

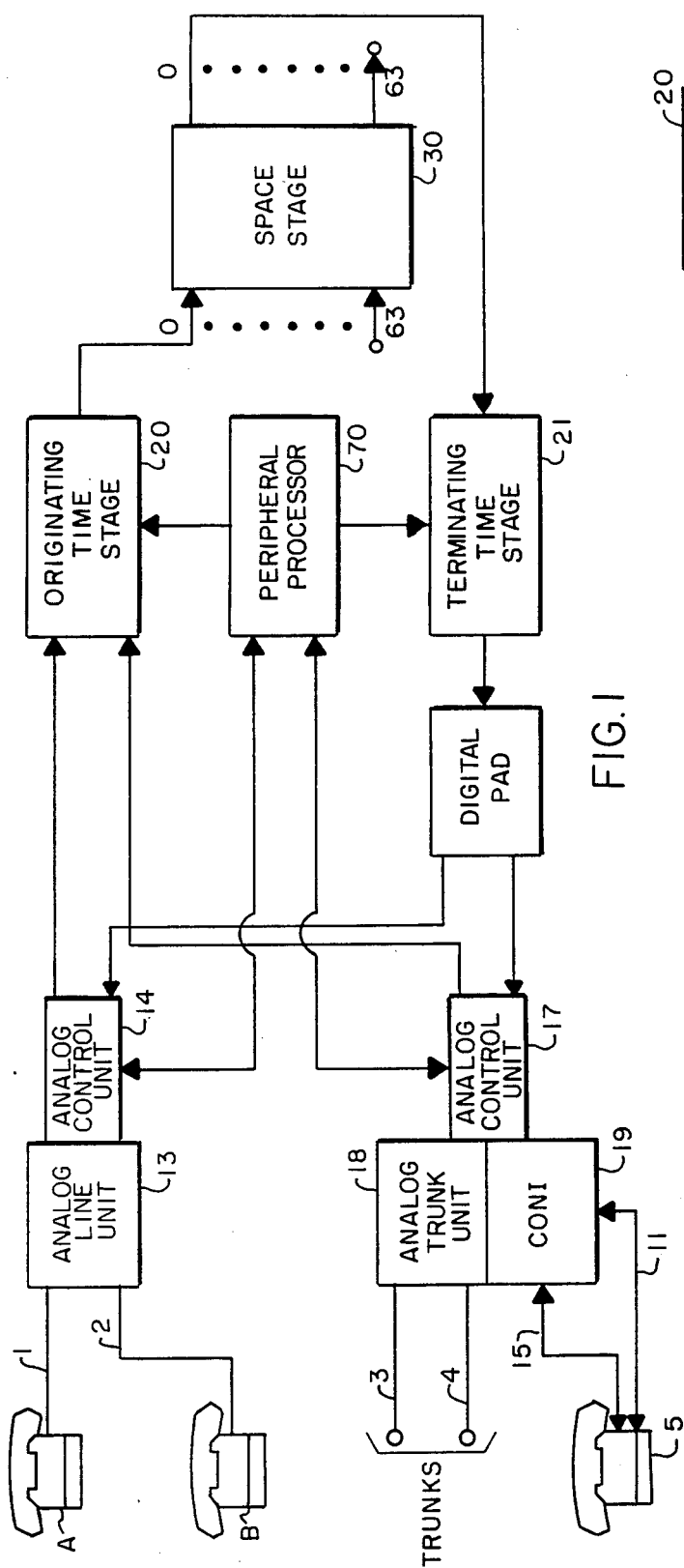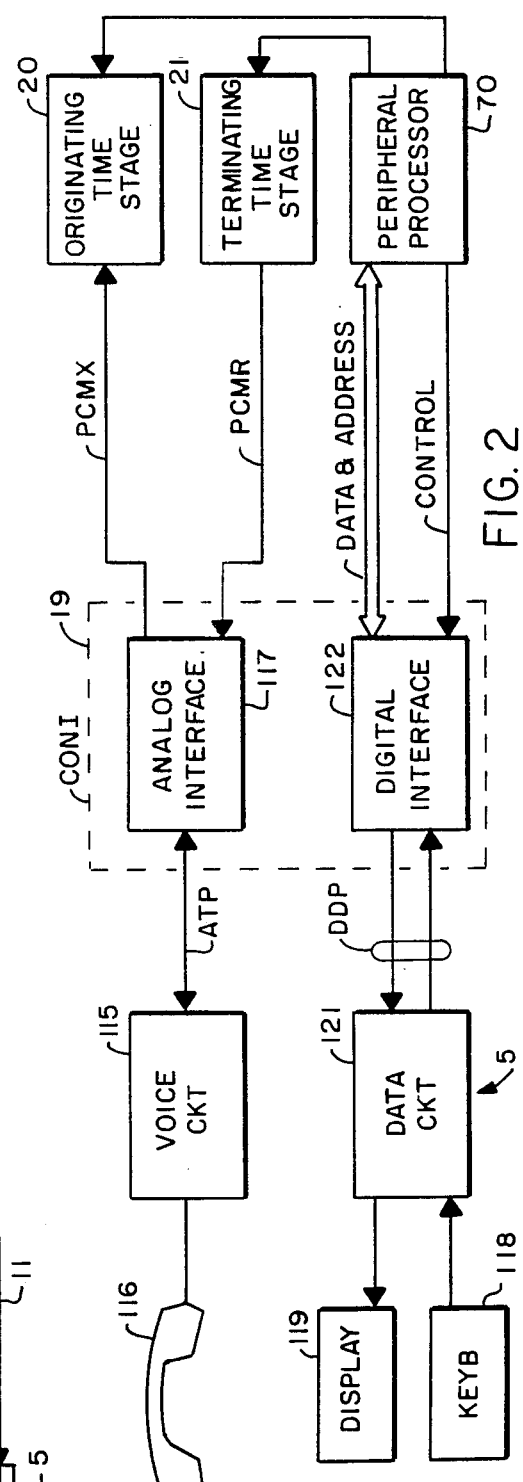

CONTROL CIRCUIT FOR A CENTREX ATTENDANT CONSOLE INTERFACE

CROSS-REFERENCE TO RELATED APPLICATIONS

The present application is related to the following co-pending U.S. Patent Applications all having the same inventive entity and being assigned to the same assignee:

Serial No. 813,322, titled, "A CENTREX ATTENDANT CONSOLE INTERFACE;"

Serial No. 813,188, titled, "AN INTERFACE CIRCUIT FOR TRANSMITTING KEYCODES TO A CENTREX;"

Serial No. 813,187, titled, "AN INTERFACE CIRCUIT FOR TRANSMITTING COMMAND CODES TO AN ATTENDANT CONSOLE;"

Serial No. 813,186, titled, "AN ARRANGEMENT FOR TRANSFERRING DATA TO A CENTREX;"

Serial No. 813,185, titled, "AN ARRANGEMENT FOR TRANSFERRING DATA TO AN ATTENDANT CONSOLE;"

Serial No. 813,176, titled, "AN ARRANGEMENT FOR INITIALIZING A CENTREX CONSOLE INTERFACE CIRCUIT."

BACKGROUND OF THE INVENTION

The present invention relates in general to telecommunication switching systems and more particularly to an interface linking voice and data communications between a CENTREX equipped central office exchange and an attendant console.

Private Branch Exchanges (PBX) are telecommunication systems which provide communication services to customers having a plurality a subscriber instruments. The PBX equipment provides a host of enhanced features such as call forwarding, intercom functions, least cost routing of calls and detailed billing. Normally the PBX is purchased by the customer and installed on premises at his location. Therefore, since the PBX handles a first level of switching among the subscriber instruments fewer central office lines are required and therefore access charges are lower. However, this savings is offset by the initial cost of the PBX equipment.

An alternative to the classical PBX is being offered in the Telecommunication market today which provides all of the features of a PBX without any of the initial costs. This system known in the field as CENTREX (central exchange) allows either a portion of a central office network switching system or a dedicated CENTREX central office network switching system to function and provide the services and features as would a dedicated PBX. The customers subscriber instruments are connected directly to the CO switch or concentrated with a multiplexing device and connected via trunk lines. The telephone operating company providing the service would service the switch therefore, alleviating the customer of maintaining his own equipment. Of course access charges are somewhat higher with the CENTREX than those with the on premises PBX equipment.

Usually PBX equipment includes an attendant console which monitors the PBX, i.e. lines or trunks in use, and provide a means of selecting or deselecting features and services as well as a system status display. Additionally, the console can also serve as a central operator station providing for attendant call handling. Such consoles are also used with CENTREX systems to provide the features discussed above.

It therefore becomes the object of the present invention to provide a console interface circuit to link an attendant console normally located at the customer premises with a CENTREX network system located at a telephone operating companies central office.

SUMMARY OF THE INVENTION

In accomplishing the object of the present invention there is provided a control circuit for effecting the transfer of data messages between an interface circuit and a CENTREX equipped central office exchange. The central office exchange includes an analog control unit connected to a peripheral processor. The analog control unit includes a control field for sending control signals to the control circuit. The interface circuit includes an input and an output sequential memory for receiving and sending respectively data messages to the peripheral processor.

An input control circuit of the present invention comprises gating means including first and second inputs connected to the control field arranged to produce a logic high output signal responsive to the simultaneous application of a first and a second control signal.

A first bistable memory means includes a data input, a reset input and at least one output. The gating means output signal is connected to the data input. The bistable memory means further includes a clock input connected to a write select signal from the peripheral processor and responsive to the write select signal, the gating means output signal is stored in the first bistable memory means and applied to its output.

A second bistable memory means includes a data input and first and second outputs. The first bistable memory means output is connected to the second bistable memory means data input. The second bistable memory means also includes a clock input connected to a source of clocking signals. During a first rising edge of the clocking signal the second bistable memory means inputs the output signal from the first bistable memory means and outputs a logic high output signal from the first output and a logic low signal from the second output.

A second gating means including first and second inputs and an output connected to the input sequential memory means, has its first input connected to the second bistable memory means output and the second input connected the control field whereby, in response to the simultaneous presence of an input sequential memory enabling signal on the second input and the logic high output by the second bistable memory means a shift-in signal is generated and applied to the input sequential memory allowing the memory to receive data messages from the peripheral processor.

An output control circuit of the present invention is substantially similar to the first control circuit with the exception of a read select signal instead of a write select signal being applied to the first bistable memory means and an output sequential memory enable signal applied from the peripheral processor instead of the input enable signal. The output signal of the second gating means is applied to the shift-out input of the output sequential memory.

A BRIEF DESCRIPTION OF THE DRAWINGS

A better understanding of the invention may be had from the consideration of the following detailed description taken in conjunction with the accompanying drawings in which:

FIG. 1 is block diagram of a CENTREX network system embodying the present invention.

FIG. 2 is block diagram showing the linking paths of the present invention interface the attendant console and the CENTREX network system.

DESCRIPTION OF THE PREFERRED EMBODIMENT

Figure 3:
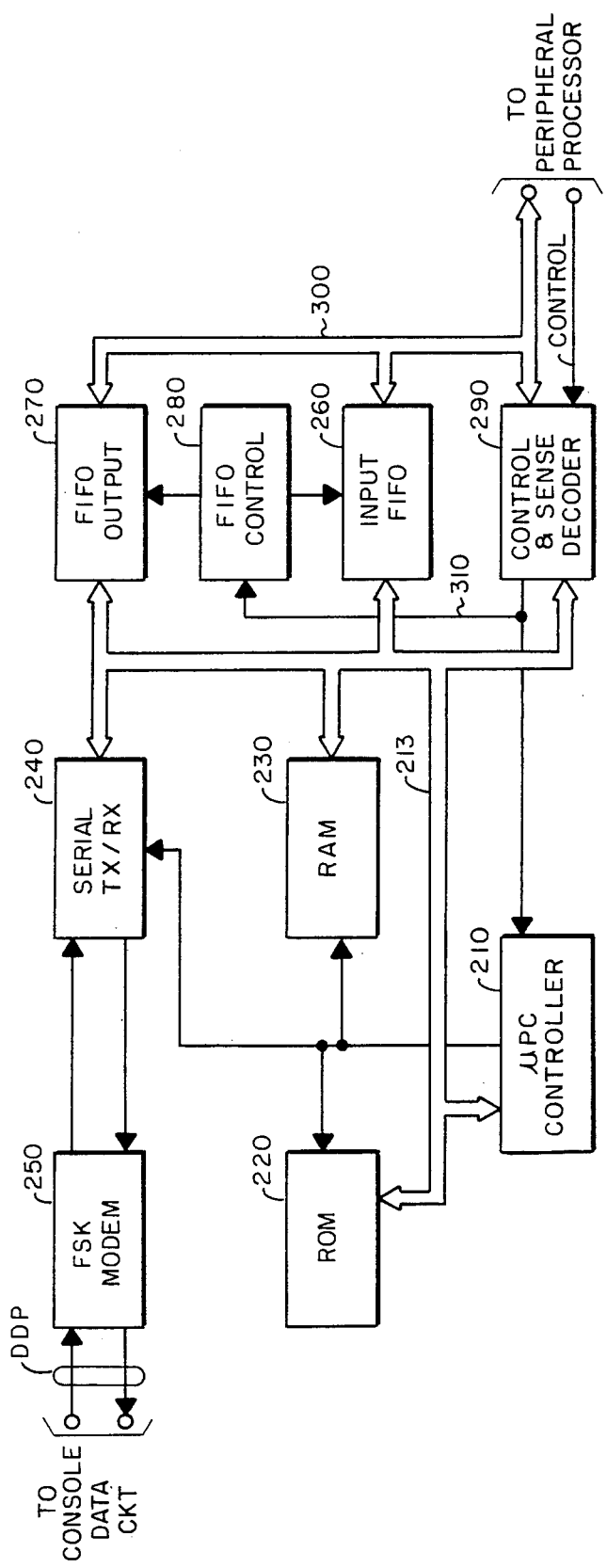
FIG. 3 is a block diagram of the digital line interface.

Referring to FIG. 1, a time-space-time digital switching system having a central exchange or CENTREX feature is shown. As a standard central office exchange telephone instruments A and B are connected to the network switching system via analog subscriber lines 1 and 2 to an analog line unit 13. The analog data received is converted to Pulse Code Modulated (PCM) digital signals for output to the next network stage. Analog line unit 13 is connected to analog control unit 14. Originating time switch 20 is connected to a space switch unit 30, which in turn is connected to a terminating time switch 21. Terminating time switch 21 is connected to analog control unit 14 and finally back to analog line unit 13 where the PCM digital signals are converted to analog signals and transmitted down subscriber lines 1 and 2.

Terminating time switch 20 is further connected to analog control unit 17, analog trunk unit 18 and trunks 3 and 4. Analog trunk unit 18 can be dedicated exclusively for CENTREX use. The trunk unit 18 connects the CENTREX customers subscriber instruments to the network system.

The Console Interface Circuit (CONI) 19 of the present invention is connected to a duplex pair of an analog control unit 17 and provides the means by which system commands, display messages and attendant console keycodes are transferred between the attendant console 5 and the CENTREX network system. The operation of the CONI circuit is transparent to both the system and the attendant console. Communication between CONI 19 and console 5 is via a digital data path 15 and an analog talk path 11.

Turning now to FIG. 2, a block diagram illustrating the interface of the attendant console to the CENTREX system is shown. The CONI interfaces the attendant console 5 and CENTREX system via two distinct communication links. In the first link, all analog signals are interfaced from the console handset 116, via voice transmission circuit 116 and analog talk path (ATP) to the analog interface 117 in the CONI 19. The analog signals are converted in the analog interface 117 into pulse code modulated (PCM) signals and transmitted to the originating time stage 20 of the CENTREX network via PCM path PCMX.

Likewise, analog information destined for the attendant console 5, is applied in PCM form to PCM path PCMX from the terminating time stage 21. The PCM information is converted into analog information by the analog interface 117 of CONI 19 and sent to handset 116 through the ATP and voice circuit 115. This communication link forms the talking path between the console 5, the CONI 19 and the network system of the CENTREX.

The data link between the console 5 and the CONI 19 is routed from a keyboard via a console data circuit 121 and a 4 wire full duplex data link (DDL) to the digital interface 122. Data input by the console operator is converted by the data circuit 121 into asynchronous data messages comprising 1 start bit, 7 data bits, an even parity bit and a stop bit. The data messages are transmitted over the DDL via a 1200 baud Frequency Shift Key (FSK) modem located in data circuit 121. The data transmitted by the console is received by the CONI 19 digital interface 122, converted into 8-bit data bytes and is processed by the CONI. The data is passed on to the network via ACU 17 to the peripheral processor 70 if no action is required by the CONI. The CONI thereby assumes a "transparent" front to the CENTREX network system and functions as a transaction exchange medium. Alternatively, in certain cases keycodes and command codes received by the CONI are acted upon and responded to by the CONI.

Data from the peripheral processor 70 in the form of command codes is transmitted to the CONI digital interface 122. Again if the data is destined only for the console the CONI formats the data into FSK asynchronous data messages and transmits the messages over the 1200 baud DDL to the console data circuit 5. The data is interpreted by the console and the appropriate display device 119 activated, i.e. LEDs turn on or off, a message displayed, the display cleared, or an audible alarm turned on or off.

Turning now to FIG. 3, a detailed explanation of the CONI digital interface will be given.

The CONI interface of the present invention is comprised of the following Large Scale Integrated (LSI) devices. A controller portion includes a microprocessor 210 connected to a Read Only Memory (ROM) 220 and Random Access Memory (RAM) 230 through an address/data bus 212. The ROM circuit 220 stores the operating system used by the microprocessor 210 which controls the operation of the CONI interface. The RAM is used as a temporary storage area for the message bytes received by the CONI. This controller portion of the CONI interface is connected to the console 5 via a serial Transmitter/Receiver (Tx/Rx) 240 and a Frequency Shift Key (FSK) modem chip 250.

The serial Tx/Rx is a LSI Universal Serial Asynchronous Receiver Transmitter (USART) such as the Intel 8259. This device under control of the microprocessor translates the 8 data bits sent to the USART on the address/data bus into the asynchronous serial data words described earlier. The FSK modem translates the data into audio tones for the transmission of the data down a twisted pair transmission path.

The connection between the CONI interface and the peripheral processor is accomplished via a pair of 64×4 First In First Out (FIFO) circuits. An input FIFO 260 and an output FIFO 270 each have one side of the FIFOs connected to address/data bus 300 which extends from the peripheral processor. Each FIFO is further connected to the CONI data bus 212. A control and sense decoder 290 is also connected to the peripheral processor address/data bus 300 and CONI address- /data bus 212. The control and sense decoder interprets control words sent by the peripheral processor detailing the type of messages sent to the CONI and any special handling required. The control and sense decoder 290 also communicates to the microprocessor and a FIFO control circuit 280 via control lead 310.

As explained earlier and shown on FIG. 2 the CONI also includes an audio interface for transmitting analog voice signals between the console 5 and CENTREX network system and CENTREX network system to the console 5. The analog interface between the console 5 and the CONI consists of a single tip and ring voice pair (T and R). On this analog pair voice conversations and DTMF tones are transmitted. The system provides the talk battery on the tip and ring leads which also powers the DTMF generator in the console. The console 5 contains a standard network interface.

Figure 4:
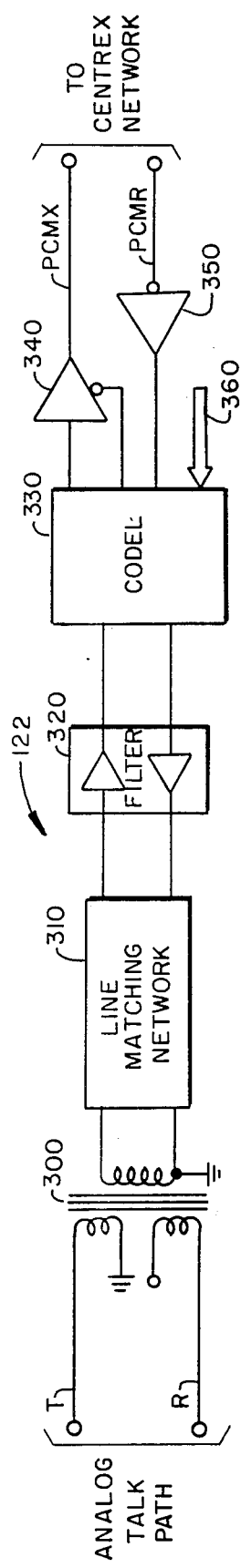
FIG. 4 is a block diagram of the analog line interface.

Turning now to FIG. 4, the analog interface of the CONI is illustrated. The interface 122 includes a two to four wire hybrid coil 300, a line matching network 310 in the form of an electrical hybrid, a transmit and receive amplifier and filter comprised of an INTEL 2912 filter and an INTEL 2910 CODEC (COder/DECoder). The hybrid coil 300 interfaces directly to the line matching network 310. The line matching network includes the necessary components for two balancing networks. This allows the use of −5 volt non-loaded lines or +12 volt loaded lines. The line matching network 310 is connected via lines TX and RX to filter network 320. The TX line connects to a transmit filter in the filter 320 as does the RX line to a receive filter. The filters also have provisions for adding the necessary gain in both the transmit and receive paths. The filter 320 is further connected via lines TX and RX to the CODEC 2910. The output of the transmit filter drives the analog input of CODEC 330. The CODECs primary function is to encode an analog signal into a 8 bit PCM word which is then sent to the network in the proper channel via driver 340 and the PCM transmit bus PCMX.

Similarly, the CODEC 330 will clock in information from the receive PCM bus PCMR and driver 350 during its assigned channel. The binary signal is then decoded into PAM (pulse amplitude modulated) signals by the CODEC and converted into an analog signal by the receive filter of filter 320. The analog signal is then applied to the console via the line matching network and the T and R leads of the hybrid coil 300. Controls signals 360 connected to the peripheral processor allows the CODEC to be programmed to operate in a specific manner i.e. transmit and receive, transmit only or operate within a specific time slot.

It should be noted since the CONI analog interface and digital interface use two distinct communication links to transmit information between the console 5 and the CENTREX network system the analog talk path and the duplex data path may be used simultaneously in transmission and reception of analog and digital data.

Before a detailed explanation of the CONI circuit is given it is believed an understanding of the message structure transmitted between the console and the CENTREX system will be helpful. The messages that are transmitted between the CONI console 5 and the CENTREX system are in an ASCII field format. All characters including numbers are transmitted as ASCII characters. The field format consists of command and data fields strung together to form a command string. This command string is treated as a single message by the console 5 or the CENTREX system. Command and data fields are separated by a "CARRIAGE RETURN" (CR). A message is terminated by a null field which is in this case a double "CARRIAGE RETURN". There is no set field length, but the maximum message length is 64 characters. Each message from the system is followed by a complementary checksum. A checksum is sent with each keycode message transmitted by console 5 or each command code transmitted by the CENTREX. The following are examples of valid command strings:

A 3 field command sent from the system to the console.

XX:MM:DDDDDDDD::C

A 2 field response sent from the console to the system.

XX:DDDDDDDD::C

In the above examples:
X=command code or keycode.
M=command code modifier.
D=command code data.
C=checksum
:="CARRIAGE RETURN" field delimiter.

All command codes, keycodes, modifiers and data are in a 7 bit ASCII format. The checksum is a 2's complement of the entire command message including the carriage return field delimiters.

Normally the data messages will carry keycodes to the CENTREX system from the console 5 or command codes from the CENTREX system to the console 5.

The CONI interface circuit communicates to the console 5 and to the CENTREX network system by accepting information from one end and transferring that information to the other. In order for this to be accomplished in the most expedient manner, the CONI uses priority structure to decide which action to take. The priority is as follows:

| PRIORITY 1 - highest - | console incoming data to CONI |
| PRIORITY 2 | console outgoing data from CONI |
| PRIORITY 3 | CONI data from the network |
| PRIORITY 4 - lowest - | CONI data to the network |

Figure 5:
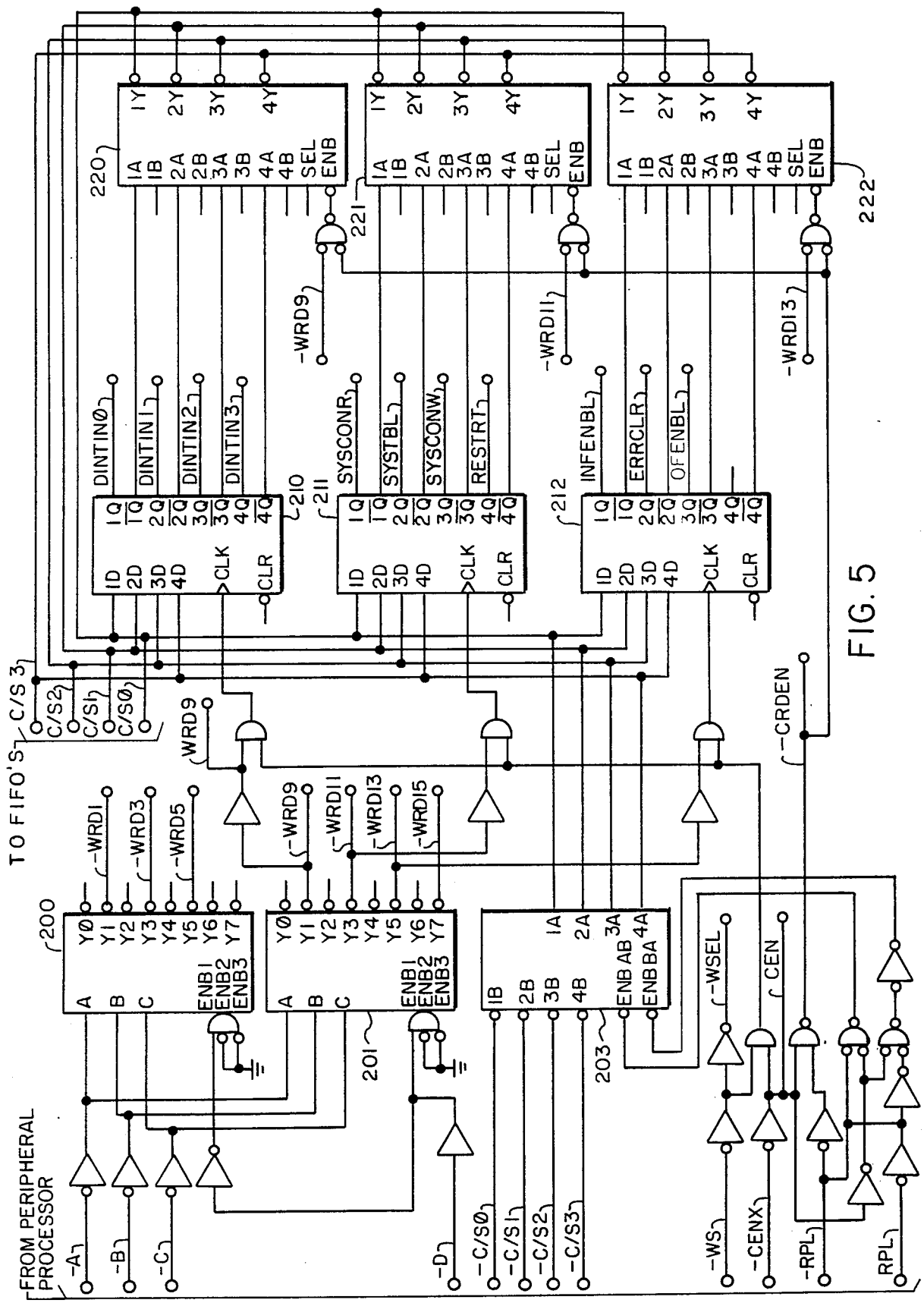
FIG. 5 is schematic of the Control and Sense Decoder shown at FIG. 3.

Turning now to FIG. 5, a detailed schematic of the control and sense decoder 290 is shown.

The control and sense decoder interfaces the CONI and CENTREX peripheral processor. The circuit is comprised of control point decoders 200 and 201, data transceiver 203, flip-flops 210-212 and data selectors 220-222. In addition, a number of logic gates are used to provide decoding of various read, write and enable control signals.

Decoders 201 and 202 have their inputs connected to the analog control unit (ACU) 17 which is connected to the peripheral processor 70. In all cases the CONI communicates to the peripheral processor 70 via a control and sense field of ACU 17.

Decoder inputs −A−−D are address leads which specify a control point or sense point type. For example, a binary "1" (0001) sent to decoders 201 and 202 is interpreted as a WORD 1 control point, setting the decoder 200 output lead labeled −WRD1. As can be seen there are 7 output control words and therefore decoders 200, 201 recognize 7 control points. The control words will be identified later in the explanation of the operation of the CONI. The ACU 17 is further connected to the control sense decoder 290 via a bidirectional data control and sense bus C/SO-C/S3. Message data as well as other control data such as ERROR words are passed between the CONI and the peripheral processor via this bidirectional bus. Finally, write control signals, −WS, −WSEL, read control signals −RPL, RPL and enabling signals −CENX, CEN are input from ACU 17 and decoded and used to write, read and enable the control words and data being transferred between the CONI and the peripheral processor 70.

Figure 6:
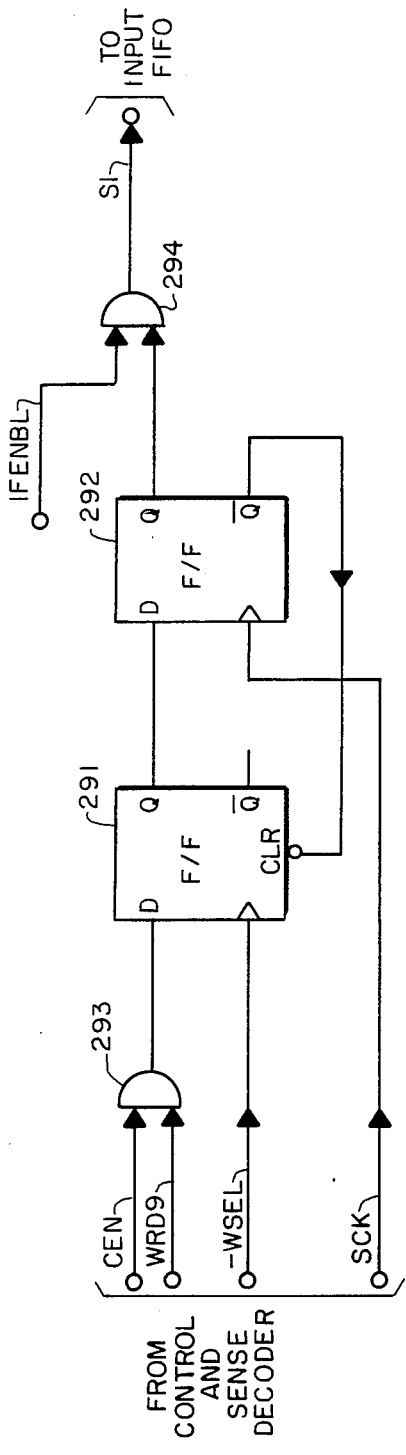
FIG. 6 is a schematic of the Shift-In FIFO Control circuit of the present invention.
Figure 7:
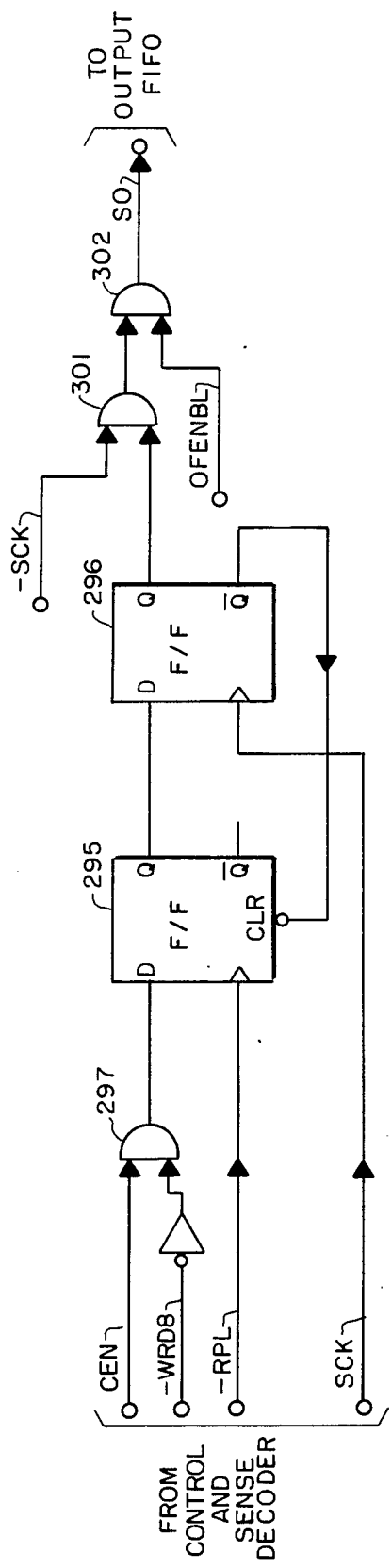
FIG. 7 is a schematic of the Shift-Out FIFO Control circuit of the present invention.

Turning now to FIGS. 6 and 7, the FIFO control circuit 280 of the present invention is shown. In order for input FIFO 270 and output FIFO 260 to accept data at their inputs a Shift-In (SI) pulse must be provided at the respective FIFO's SI input. Likewise, in order for data to be read from the FIFO, a Shift-Out (SO) pulse must be provided at its SO input.

With reference to FIG. 6 the circuit for producing the SI pulse will now be explained. The shift-in control circuit is comprised of flip-flops 291, 292 and AND gate 293, 294. Signals CEN from the sense and control decoder of FIG. 5 and WRD9 are combined by AND gate 293. Signal CEN is a card enable signal which is provided by ACU 17. WRD9 is a decoded output which indicates that word 9 of the control field is being accessed by the peripheral processor. The output of AND gate 293 indicates that the peripheral processor is preparing to output to the CONI a command code message nibble. The logic "1" output produced by AND gate 293 is applied to the D input of flip-flop 291. During the write operation signal −WSEL will fall to a logic "0" and rise to a logic "1". The −WSEL signal indicates that a write operation is taking place on the accessed word (word 9). The −WSEL is applied to flip-flop 291 clock input where the logic low to high transition clocks in the logic "1" applied at flip-flop 291 D input. This causes the Q output of flip-flop 291 to assume a logic "1" state. The Q output of flip-flop 291 is connected to the D input of flip-flop 292. The clock input of flip-flop 292 is connected to signal SCK which is a 2.95 MHz clock signal from the CENTREX network system. The D input of flip-flop 292 is clocked into flip-flop 292 on the rising edge of SCK causing the Q output of flip-flop 292 to go to a logic "1" state. Concurrently, the −Q output of flip-flop 292 goes to a logic "0" state and is input into the clear input (CLR) of flip-flop 291. As flip-flop 291 is cleared the next rising edge of SCK will clock in from the D input of flip-flop 292 a logic "0", changing the Q output to logic "0" and −Q output to logic "1".

The SI pulse is input to AND gate 294 and is combined with signal IFENBL which is decoded from control word 13 and flip-flop 212 of control and sense decoder 290. Signal IFENBL is used to gate the SI pulse generated by flip-flops 291 and 292 to the SI input of the input FIFO 260. With a logic "1" applied to the SI input of FIFO 260 the FIFO accepts command code nibbles from the peripheral processor.

Turning now to FIG. 7, the shift-out FIFO control signal is shown. The shift-out FIFO control circuit comprises flip-flops 295, 296 and gates 297 and 301, 302. Signals CEN from the sense and control decoder of FIG. 5 and −WRD1 are combined by AND gate 297. Signal CEN is a card enable signal which is provided by ACU 17. −WRD1 is a decoded output which indicates that word 1 of the control field is being accessed by the peripheral processor. The output of AND gate 293 indicates that the peripheral processor is preparing to read from the CONI a keycode message nibble. The logic "1" output produced by AND gate 297 is applied to the D input of flip-flop 295. During the read operation signal −RPL will fall to a logic "0" and rise to a logic "1". The −RPL signal indicates that a read operation is taking place on the accessed word (word 1). The −RPL is applied to flip-flop 295 clock input where the logic low to high transition clocks in the logic "1" applied at flip-flops 295 D input. This causes the Q input of flip-flop 295 to assume a logic "1" state. The Q output of flip-flop 295 is connected to the D input of flip-flop 296. The clock input of flip-flop 296 is connected to signal SCK which is a 2.95 MHz clock signal from the CENTREX network system. The D input of flip-flop 296 is clocked into the flip-flop on the rising edge of SCK causing the Q output of flip-flop 296 to go to a logic "1" state. Concurrently, the −Q output of flip-flop 296 goes to a logic "0" state and is input into the clear input (CLR) of flip-flop 295. As flip-flop 295 is cleared the next rising edge of SCK will clock in from the D input of flip-flop 296 a logic "0" changing the Q output to logic "0" and the −Q output to logic "1".

The SO pulse is input to AND gate 301 and is combined with signal −SCK the complement of signal SCK. The SO pulse output by AND gate 301 is combined with signal OFENBL at AND gate 302 which is decoded from control word 13 and flip-flop 212 of control and sense decoder 290. Signal OFENBL is used to gate the SO pulse generated by flip-flops 295 and 296 to the SO input of the output FIFO 270. With a logic "1" applied to the SO input of FIFO 270 the FIFO transfers keycode nibbles from the CONI to the peripheral processor.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A control circuit for effecting the transfer of data messages between an interface circuit and a CENTREX equipped central office exchange, said central office exchange including an analog control unit connected to a peripheral processor, said analog control unit including a control field for sending control signals to said control circuit and said interface circuit including an input sequential memory for receiving data messages from said peripheral processor, said control circuit comprising:

gating means including first and second inputs connected to said control field arranged to produce a logic high output signal responsive to the simultaneous application of a first and a second control signal;

first bistable memory means having a data input, a reset input and at least one output, said gating means output signal connected to said data input and said bistable memory means further including a clock input connected to a write select signal from said peripheral processor and in response to said write select signal said gating means output signal is stored in said first bistable memory means and applied to said output;

second bistable memory means having a data input and first and second outputs, said first bistable memory means output is connected to said second bistable memory means data input, and said second bistable memory means further including a clock input connected to a source of clocking signals where during a first rising edge of said clocking signal said second bistable memory means inputs said output signal from said first bistable memory means and outputs a logic high output signal from said first output and a logic low signal from said second output; and second gating means having first and second inputs and an output connected to said input sequential memory means, said first input connected to said second bistable memory means first output and said second input connected to said control field whereby, in response to the simultaneous presence of an input sequential memory enabling signal on said second input and the logic high output by said second bistable memory means a shift-in signal is generated and applied to said input sequential memory allowing said memory to receive data messages from said peripheral processor.

2. The control circuit as claimed in claim 1, wherein: said logic low output by said second bistable memory means output is connected to said first bistable memory means reset input whereby, the logic high output by said first bistable memory means is changed to a logic low output and input to said second bistable memory device during a second rising edge of said clocking signal changing the signal applied to said second gating means first input to a logic low, disabling the shift-in signal and suspending the transfer of said data messages.

3. The control circuit as claimed in claim 2, wherein: said first gating means is a AND gate and said first control signal is an interface enable signal and said second signal is a receive data control word from said peripheral processor.

4. The control circuit as claimed in claim 2, wherein: said first and second bistable memory means are D-type flip-flop devices.

5. The control circuit as claimed in claim 2, wherein: said second gating means is a AND gate and said input sequential memory enabling signal is a control signal output by said peripheral processor.

6. A control circuit for effecting the transfer of data messages between an interface circuit and a CENTREX equipped central office exchange, said central office exchange including an analog control unit connected to a peripheral processor, said analog control unit including a control field for sending control signals to said control circuit and said interface circuit including an output sequential memory for sending data messages to said peripheral processor, said control circuit comprising:

gating means including first and second inputs connected to said control field arranged to produce a logic high output signal responsive to the simultaneous application of a first and a second control signal;

first bistable memory means having a data input, a reset input and at least one output, said gating means output signal connected to said data input and said bistable memory means further including a clock input connected to a read select signal from said peripheral processor and in response to said read select signal said gating means output signal is stored in said first bistable memory means and applied to said output;

second bistable memory means having a data input and first and second outputs, said first bistable memory means output is connected to said second bistable memory means data input, and said second bistable memory means further including a clock input connected to a source of clocking signals where during a first rising edge of said clocking signal said second bistable memory means inputs said output signal from said first bistable memory means and outputs a logic high output signal from said first output and a logic low signal from said second output;

second gating means having first and second inputs and an output connected to said output sequential memory means, said first input connected to said second bistable memory means first output and said second input connected to said control field whereby, in response to the simultaneous presence of an output sequential memory enabling signal on said second input and the logic high output by said second bistable memory means a shift-out signal is generated and applied to said output sequential memory allowing said memory to send data messages to said peripheral processor.

7. The control circuit as claimed in claim 6, wherein: said logic low output by said second bistable memory means output is connected to said first bistable memory means reset input whereby, the logic high output by said first bistable memory means is changed to a logic low output and input to said second bistable memory device during a second rising edge of said clocking signal changing the signal applied to said second gating means first input to a logic low, disabling the shift-out signal and suspending the transfer of said data messages.

8. The control circuit as claimed in claim 6, wherein: said first gating means is a AND gate and said first control signal is an interface enable signal and said second signal is a send data control word from said peripheral processor.

9. The control circuit as claimed in claim 6, wherein: said first and second bistable memory means are D-type flip-flop devices.

10. The control circuit as claimed in claim 6, wherein: said second gating means is an AND gate and said output sequential memory enabling signal is a control signal output by said peripheral processor.

11. The control circuit as claimed in claim 10, wherein: said control circuit includes a third AND gate having a first input connected to said second bistable memory means first output and a second input connected to the complement of said clocking signal whereby, an output signal is output and applied to said second AND gate first input.

* * * * *